United States Patent [19]

Hauck

[11] Patent Number: 5,266,108
[45] Date of Patent: Nov. 30, 1993

[54] USING COMPACTED TITANIUM DIOXIDE PIGMENT PARTICLES IN THE COOLING SECTION OF THE CHLORIDE PROCESS FOR MAKING TIO$_2$

[75] Inventor: Howard M. Hauck, New Johnsonville, Tenn.

[73] Assignee: E. I. Du Pont de Nemours and Company, Wilmington, Del.

[21] Appl. No.: 872,206

[22] Filed: Apr. 22, 1992

[51] Int. Cl.$^5$ ............................................. C09C 1/36
[52] U.S. Cl. ................................. 106/437; 423/77; 423/613
[58] Field of Search ................. 106/437; 423/77, 612, 423/613

[56] References Cited

U.S. PATENT DOCUMENTS

| | | | |
|---|---|---|---|
| 2,488,439 | 11/1949 | Schaumann | 23/202 |
| 2,488,440 | 11/1949 | Schaumann | 23/202 |
| 2,559,638 | 7/1951 | Krchma et al. | 23/202 |
| 2,721,626 | 10/1955 | Rick | 626/55 |
| 2,833,627 | 5/1958 | Krchma | 23/202 |
| 2,899,278 | 8/1959 | Lewis | 423/613 |
| 4,784,841 | 11/1988 | Hartmann et al. | 423/613 |

Primary Examiner—Mark L. Bell
Assistant Examiner—Chris Gallo
Attorney, Agent, or Firm—David J. Gould

[57] ABSTRACT

In the process for cooling the reaction products of the vapor phase oxidation of titanium tetrachloride to titanium dioxide comprising: (a) passing said reaction products through an externally cooled conduit, and (b) admixing with the reaction products particulate scrubbing material which removes solid deposits adhered to the interior walls of the conduit, the improvement characterized by:

using as the scrubbing material about 0.5-15 percent by weight, based on the weight of titanium dioxide, of compacted particles of titanium dioxide pigment, said compacted particles of titanium dioxide pigment being produced by subjecting titanium dioxide pigment to sufficient pressure to form same.

10 Claims, No Drawings

USING COMPACTED TITANIUM DIOXIDE PIGMENT PARTICLES IN THE COOLING SECTION OF THE CHLORIDE PROCESS FOR MAKING TIO$_2$

BACKGROUND OF THE INVENTION

In the chloride process for making titanium dioxide, titanium tetrachloride is oxidized in the vapor phase to titanium dioxide. The titanium dioxide and other reaction products are then passed through an externally cooled conduit where they are cooled and coalesced. During the cooling process, it has been found that solid deposits can adhere to the internal walls of the conduit and can significantly impair the heat transfer capability of the conduit. To remedy this problem, scrubbing materials can be introduced into the cooling conduit. For example U.S. Pat. No. 2,721,626 discloses the use of calcined titanium materials. Also, U.S. Pat. Nos. 2,899,278 and 4,784,841 disclose the use of calcined titanium dioxide for scrubbing materials. If desired, the scrubbing material can aid the cooling process by introducing it into the cooling conduit at a temperature less than that of the reaction products.

A problem with the existing scrubbing materials, however, is that they can contaminate the final titanium dioxide pigment product. For example, the calcined titanium dioxide and silica sand particles are larger than the finished pigment particles and are difficult to remove. This contamination, of course, is undesirable because it can cause lumps in a paint film, or on the surface of paper, polymers or other materials in which the final titanium dioxide pigment product is incorporated. Residual calcined titanium dioxide scrubbing material and silica sand grains can also dull TiO$_2$ processing equipment and the processing equipment of users of TiO$_2$, for example, paper cutters and other paper processing equipment.

SUMMARY OF THE INVENTION

In accordance with the process of this invention there is provided:

In the process for cooling the reaction products of the vapor phase oxidation of titanium tetrachloride to titanium dioxide comprising: (a) passing said reaction products through an externally cooled conduit, and (b) admixing with the reaction products particulate scrubbing material which removes solid deposits adhered to the interior walls of the conduit, the improvement characterized by:

using as the scrubbing material about 0.5-15 percent by weight, based on the weight of titanium dioxide, of compacted particles of titanium dioxide pigment, said compacted particles of titanium dioxide pigment being produced by subjecting titanium dioxide pigment to sufficient pressure to form same.

It has been found that the process of this invention eliminates the problems of the prior art because the compacted particles of titanium dioxide pigment scrubbing material can be easily broken down into normal titanium dioxide pigment of acceptable particle size in the cooling conduit and/or in the process for finishing the pigment. It also has been found that the use of the process of this invention can improve the carbon black undertone ("CBU") of the titanium dioxide pigment. CBU is described in U.S. Pat. No. 2,488,440 (which is hereby incorporated by reference) and is a measure of particle size. The higher the CBU, the smaller the particle size and the higher the quality of the pigment for many applications. Moreover, the process of this invention can be considerably less costly than the prior art processes because calcining heat is not required to form the scrubbing particles. In addition, the compacted TiO$_2$ scrubbing material of this invention does not cause excessive dulling or wearing of titanium dioxide processing equipment or the equipment of users of titanium dioxide, for example, paper cutting equipment and other paper processing equipment. Finally, the process of this invention provides an excellent means for recycling and reprocessing final titanium dioxide pigment product which does not meet required specifications.

DETAILED DESCRIPTION OF THE INVENTION

Titanium Dioxide Pigment

The process for making titanium dioxide pigment by the vapor phase oxidation of titanium tetrachloride to titanium dioxide is well known. In this regard, U.S. Pat. Nos. 2,488,439, 2,488,440, 2,559,638, and 2,833,627, and the patents mentioned above, provide details for the process, and the cooling section of the process, and are hereby incorporated by reference.

Generally, any titanium dioxide pigment can be used to make the compacted titanium dioxide pigment particles useful in the process of this invention. Preferred is titanium dioxide pigment made by the oxidation of titanium tetrachloride to titanium dioxide, i.e., the chloride process. However, titanium dioxide pigment made by the sulfate process can be used also.

By the term "titanium dioxide pigment" is meant (1) raw titanium dioxide (i.e., that which has not been subject to any finishing operation) and (2) titanium dioxide which has been subject to any intermediate or final finishing operation(s), including, but not limited to drying, grinding, micronizing, and coating or subjecting the pigment to various surface treatments. Raw titanium dioxide includes that formed by the vapor phase oxidation of titanium tetrachloride to titanium dioxide and which has been cooled by passing it through the cooling conduit of such process. The term "titanium dioxide pigment" also includes titanium dioxide pigment which has incorporated therein minor amounts (e.g. less than 10% by weight), of other additives such as Al$_2$O$_3$ and/or P$_2$O$_5$ as disclosed in U.S. Pat. Nos. 3,547,671 and 4,214,913, which are hereby incorporated by reference.

Generally, there should be avoided appreciable amounts of calcined titanium dioxide pigment (e.g. calcined at 500° C. or above) because it can exhibit the problems described in the above section entitled "Background of the Invention". Preferably, the use of such calcined TiO$_2$ should be avoided. Typically, the titanium dioxide pigment useful for forming the compacted scrubbing material of this invention will have a particle size of at least 90 percent by weight less than 5 microns, and preferably at least 90 percent by weight less than 1 micron.

A preferred embodiment of this invention is TiO$_2$ pigment which has been coated with up to 10 percent by weight of alumina, silica or mixtures thereof, which appear to aid the formation of compacted pigment particles having good performance characteristics. Suitable processes for coating the TiO$_2$ pigment are known in the art and include, for example those disclosed in U.S. Pat. Nos. 3,804,655, 4,075,031, and 3,928,057, which are hereby incorporated by reference.

Compacted Titanium Dioxide Pigment

The compacted particles of titanium dioxide pigment useful in this invention can be formed by any suitable method. One suitable method comprises subjecting the pigment to sufficient pressure to compact it. The compacted pigment can then be used as is, if it has the desired particle size. If the compacted pigment has a particle size which is too large, it can be broken or comminuted into smaller size, and then classified into compacted pigment having the desired particle size. Compacted pigment which is too large or too small can be recycled to the compaction process.

The pigment can be compacted by subjecting it to pressure by any suitable means. Preferred are mechanical means, such as, but not limited to, the use of pressure rolls and presses. Specifically, one preferred means is to feed the titanium dioxide into counter-rotating, opposing pressure rolls. If desired, the rolls can have depressions on their surfaces which can aid the formation of the compacted particles of pigment. The feed to the rolls can be accomplished by any suitable means, including, but not limited to, a screw feeder which also compacts and forces air from the pigment. Another specific means is to feed the pigment to a mechanical press which subjects the pigment to the required amount of pressure. If desired, either the moving face of the press, the plate which the face of the press will exert pressure on, or both, can have depressions on their surfaces which aid the formation of the compacted pigment particles.

Ordinarily, the compacting operation will be carried out at ambient temperature. However, the compacting operation can be carried out at any temperature up to that which would calcine, sinter or fuse the pigment, e.g., less than about 500° C.

The pressure necessary to form acceptable compacted titanium dioxide pigment particles useful in the process of this invention can vary considerably depending on the nature of the pigment being used; whether or not the pigment has been subjected to surface treatment; the length and diameter of the cooling conduit; whether or not the conduit has any bends; the extent to which the cooling conduit has a tendency to have solid deposits adhere to it, etc. It has been found, however, that for many applications good quality compacted titanium dioxide can be made by using pressure rolls which exert a pressure of at least 10,000 pounds per linear inch, preferably at least 20,000 pounds per linear inch, and most preferably at least 30,000 pounds per linear inch. As used herein, the pressure per linear inch for any particular pressure roll can be determined by dividing the total pressure exerted by the roll by the width of the portion of the roll which exerts pressure on the pigment. The pressure rolls can have any diameter which forms satisfactory compacted pigment. Preferably, the diameter will be about 5-40 inches, more preferably about 10-30 inches and most preferably about 15-25 inches.

The degree of hardness required for the compacted titanium dioxide pigment can vary considerably depending on the factors mentioned in first sentence of the immediately preceding paragraph. Generally, the compacted titanium dioxide pigment (1) should be hard enough to scrub satisfactorily the interior walls of the cooling conduit, and (2) should be soft enough to break down into pigment of acceptable particle size at the end of the cooling conduit and/or after the final processing of the pigment. It should be noted, however, that compared to prior art calcining processes, it generally is easier and cheaper to produce, with this invention, scrub material having the desired degree of hardness and balance of properties.

The information set forth above provides general guidelines. However, due to the many variables involved, a good procedure is to produce various samples of compacted titanium dioxide pigment and use them in the cooling conduit for the chloride $TiO_2$ process. If the compacted titanium dioxide pigment is satisfactory, it will acceptably scrub the interior walls of the cooling conduit, and will break down into pigment of acceptable particle size at the end of the cooling conduit or after the final processing of the pigment. Whether or not acceptable scrubbing takes place can be determined by measuring the temperature of the gases in the cooling conduit. A rise in temperature usually indicates poor scrubbing and a resulting build-up of solid deposits on the interior surface of the cooling conduit. Furthermore, a simple intuitive test which often can determine whether or not a sample of compacted pigment is acceptable for testing is to rub a portion of the sample between the thumb and forefinger; if the sample does not readily crumble, then it likely will be a suitable sample for testing in the cooling conduit.

After the pigment is compacted, it can be used as is if it has the desired size. Compacted pigment particles which are too small can be recycled to the compaction operation. If the compacted pigment has too large a particles size, it can be broken or comminuted into smaller particles, and then classified into particles having the desired size. Classification can be carried out by any suitable means including screening or seiving. If desired, the compacted particles of pigment, obtained by classification, which are too small and/or too large to use in the process of this invention can be recycled to the compacting operation. In fact, it has been found that this recycle can be beneficial to build up, by successive passes through the compacting operation, compacted pigment particles having the desired size and hardness. And, for some pigments, and/or compaction equipment, such recycle may be necessary to produce acceptable compacted titanium dioxide.

Preferably the compacted $TiO_2$ pigment useful in the process of this invention will have a particle 0.5-15 millimeters, and most preferably about 1.0-10 millimeters.

Use of Compacted Titanium Dioxide Pigment

Compacted titanium dioxide pigment scrubbing material, produced as described above, can be used in the cooling conduit for cooling the reaction products of the vapor phase oxidation of titanium tetrachloride to titanium dioxide. Preferably, the compacted particles of titanium dioxide pigment scrubbing material will be present in an amount of about 0.5-20 percent and preferably about 0.5-15 percent by weight, based on the weight of the titanium dioxide produced by the process. Preferably, the compacted titanium dioxide scrubbing material will be introduced into the cooling conduit at or near its juncture with the reactor to oxidize titanium tetrachloride to titanium dioxide. Generally, the velocity in the cooling conduit will be about 10-75 feet per second. Preferably, the compacted titanium dioxide scrub material will be introduced into the cooling conduit at a temperature lower than that of the cooling conduit, which will aid the cooling process. Preferably, ambient temperature will be used. Other specifics and details regarding using scrubbing materials and the cooling conduit are set forth in U.S. Pat. Nos. 2,721,629 and 2,899,278, which are hereby incorporated by reference.

The following examples illustrate this invention:

EXAMPLE 1

$TiO_2$ pigment was prepared by oxidizing $TiCl_4$ into pigmentary $TiO_2$ having a primary particle size predominantly under 1.0 microns. The resulting $TiO_2$ was slurried in $H_2O$, neutralized, filtered, and dried to approximately 0.2 percent by weight moisture.

The $TiO_2$ was then fed into a Bepex Corporation model MS-60 roll compaction machine. The first stage of the machine comprised a conical-shaped precompression and deaeration chamber which was equipped with a high efficiency, variable speed screw which forced the $TiO_2$ into the nip area preceding entry into two oppositely rotating pressure rolls. These rolls exerted a pressure on the $TiO_2$ of approximately 30,000 pounds per linear inch of roll width. The roll surfaces had approximately ¾ inch almond-shaped depressions. The roll diameter was 20½ inches. The roll speed was 5.5 rpm and the motor driving it drew approximately 21 amperes at 440 volts. The high efficiency precompression screw was operated at approximately 60 rpm and the motor driving it drew approximately 6.5 amperes at 440 volts.

After exiting the rolls, the compacted $TiO_2$ was sent through a comminuting mill operating at low speed and efficiency. The mill consisted of a shaft having a plurality of metal fingers attached to it which, during rotation, struck the compacted pigment and broke it into smaller pieces. The operation of the mill did not significantly comminute any hard material, but did break up soft material for recycle with the virgin material. This recycle appears to aid obtaining good quality $TiO_2$ pigment having the advantages mentioned in the Background of the Invention.

After exiting the mill, the material was sent to a vibratory screening device. Material passing through a 5-mesh screen was recycled with virgin feed and material remaining on the screen was collected as product.

EXAMPLE 2

The process used in Example 1 was repeated using as the feed material, finished $TiO_2$ pigments having the following surface treatments: Sample A—6.8 percent alumina and 8.9 percent silica; Sample B—4.2 percent alumina; and Sample C—1.4 percent silica and 4.3 percent alumina. The hardness and yield of the compacted $TiO_2$ pigment was increased beneficially by the presence of the alumina and/or silica.

EXAMPLE 3

For this example, the procedure of Example 1 was repeated, but the compaction equipment was manufactured by the Fitzpatrick Company. This equipment apparently has a highly efficient precompaction and deaeration screw system. It consists of a horizontal screw feeding into the midsection of a vertical high energy precompaction and deaeration screw. The pressure rolls were 10 inches in diameter, and had sine-wave shaped depressions on their surfaces which were about one-fourth inch deep.

It was found that this equipment could produce compacted $TiO_2$ scrub material made from raw $TiO_2$ (i.e., that exiting the oxidation section of the chloride $TiO_2$ process, without any surface treatment).

EXAMPLE 4

The compacted $TiO_2$ scrubbing material of Examples 1 and 2 were tested in a chloride process $TiO_2$ plant. It was found that they produced good scrubbing action, as evidenced by being able to maintain the temperature of the cooling conduit within normal limits. Also, after normal processing to finish the pigment, it was found that the scrub material of this invention had been broken up, so that it was no longer evident in the finished $TiO_2$ pigment product.

The invention claimed is:

1. In the process for cooling the reaction products of the vapor phase oxidation of titanium tetrachloride to titanium dioxide comprising: (a) passing said reaction products through an externally cooled conduit, and (b) admixing with the reaction products particulate scrubbing material which removes solid deposits adhered to the interior walls of the conduit, the improvement characterized by:
   using as the scrubbing material about 0.5–15 percent by weight, based on the weight of titanium dioxide, of compacted particles of uncalcined titanium dioxide pigment, said compacted particles of titanium dioxide pigment being produced by subjecting titanium dioxide pigment to sufficient pressure to form same.

2. The process of claim 1 wherein the compacted particles of titanium dioxide pigment are formed by subjecting titanium dioxide pigment to a pressure of at least about 10,000 pounds per linear inch in opposed, counter-rotating pressure rolls.

3. The process of claim 2 wherein the pressure is at least about 20,000 pounds per linear inch.

4. The process of claim 2 wherein the pressure is at least about 30,000 pounds per linear inch.

5. The process of claim 1 wherein the particles have a size of about 0.15–20 millimeters.

6. The process of claim 1 wherein the particles have a size of about 0.5–15 millimeters.

7. The process of claim 1 wherein:
   the particles have a size of about 1.0–10 millimeters,
   the particles have a coating of alumina, silica, or mixtures thereof, and
   the particles are formed by subjecting titanium dioxide pigment to a pressure of at least about 10,000 pounds per linear inch in opposed, counter-rotating pressure rolls.

8. The process of claim 1 wherein:
   the particles have a size of about 1.0–10 millimeters, and
   the particles are formed by subjecting titanium dioxide pigment to a pressure of at least 20,000 pounds per linear inch in opposed, counter-rotating pressure rolls.

9. Process of claim 1 wherein the compacted particles of titanium dioxide pigment are formed by
   (a) introducing titanium dioxide pigment to a screw feeder which compacts and forces air from the pigment,
   (b) feeding the pigment from step (a) to opposed, counter-rotating pressure rolls which exert at least 10,000 pounds per linear inch on the pigment and form compacted titanium dioxide pigment,
   (c) classifying the compacted pigment resulting from step (b) into (i) particles having a size of about 0.15–20 millimeters, and (ii) particles having a size of less than or more than about 0.15–20 millimeters, and (d) recycling the particles having a size of less than or more than about 0.15–20 millimeters to step (a).

10. The process of claim 1 wherein the compacted titanium dioxide scrubbing material causes an increase in the carbon black undertone of the pigment produced.

* * * * *